Oct. 31, 1933.　　　　L. SAIVES　　　　1,933,033
AUTOMATIC AIR OR MIXTURE ADMISSION VALVE FOR INTERNAL COMBUSTION ENGINES
Filed Dec. 14, 1931
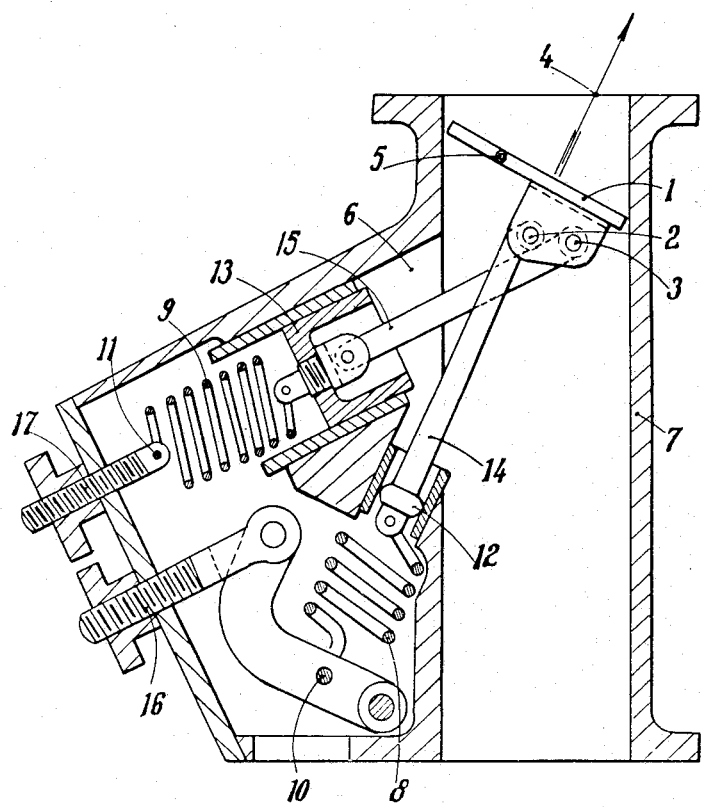

Patented Oct. 31, 1933

1,933,033

UNITED STATES PATENT OFFICE 1,933,033

AUTOMATIC AIR OR MIXTURE ADMISSION VALVE FOR INTERNAL COMBUSTION ENGINES

Leon Saives, Billancourt, France, assignor to Louis Renault, Billancourt, France Application December 14, 1931, Serial No. 581,001, and in France January 15, 1931

2 Claims. (Cl. 137—153)

The invention relates to an automatic valve for explosion or internal combustion engines inserted in the admission pipes of the mixture or of the air supply.

According to the invention this valve is attached on an excentric axle and is subjected to the reaction of the gaseous current, to the action of a resilient mechanism and to that of a piston upon which acts the vacuum existing in the pipes above the valve. The whole is regulated in such way that, without any substantial vacuum below the valve, when the engine attains the predetermined maximum speed, the valve is drawn down by the gases and closes. If there is a vacuum in the pipe the action of the gases is weaker because they are less dense; the piston subjected to the vacuum and its transmitting members act upon the valve to compensate for and exceed the weak action of the gases.

In the accompanying drawing there is shown by way of example one method of carrying out the invention in practice.

The resilient mechanism pulls directly upon the valve 1 at the points 2 and 3 adjacent to the point at which the reaction 4 of the gases is applied and in a direction substantially opposite to that of said reaction; this arrangement has the advantage of diminishing or even of removing the reactions at the pivot 5 of the valve spindle or of the valve about its spindle if this latter is fixed, the result of which is to render the apparatus very sensitive. The rod or rods which control the valve pass through an opening 6 provided in the body 7, constituting the passage for the gases. The resilient mechanism is constituted by one or two springs such as 8 or 9 attached on the one hand to fixed points 10 and 11, on the other hand to a plug 12 or to a piston 13 which operated the valve 1 through the intermediary of the rod 14 or of a connecting rod 15, the points of attachment, the lengths and the resilience of the spring or springs being predetermined so as to set up for each position of the valve 1 the desired force to oppose the resistance of the gases 4 at the predetermined limiting speed of the engine. The use of two springs instead of one only, which involves a greater range of adjustment and of dimensions of the springs, allows of attaining a more exact balancing of the forces and of a greater exactness of the apparatus. A certain number of elements of the construction such as the dimensions of the spring or springs and the points of attachment to the valve can be predetermined. The fixed points 10 and 11 may be shifted for the purpose of adjustment by means of screws 16 and 17.

Very good balancing is obtained with arrangements and adjustments such that a single spring may act when the valve is open and that from and after a certain position of the valve a second spring, which had remained relaxed until then, adds its action to that of the first one up to the closing of the valve.

When full output of the engine is not required the carburettor is throttled and the gases passing into the supply pipes are less dense; for the same engine speed, their action upon the valve is thus weaker; it is preferable notwithstanding this that the valve should close with a weaker action of the gases, since the engine is not being pressed and it is then necessary that a correcting mechanism should act in conjunction with the gases so as to balance the action of the resilient mechanism. Such correcting mechanism is constituted by the piston 13 subjected on one side to atmospheric pressure and on the other to the static pressure of the gases. The piston serves at the same time to protect the spring 9 from the vapour of petrol or other fuel.

A spring such as 8 may also be protected from the petrol vapour by means of a simple plug 12, upon which the pressure of the gases has little or no action.

Finally if it is not wished to protect the springs from petrol vapour, they may be simply attached on the one hand to an adjustable point inside a chamber communicating with the gas passage, on the other hand to the valve either directly or by means of a connecting rod.

I claim:

1. In combination, a gas intake pipe for internal combustion engines, a spindle, a valve mounted in unbalanced condition on said spindle, and adapted to be moved by the passing fluid, a chamber adjacent said intake, means mounted in said chamber adapted for controlling said valve, said means comprising a piston submitted on its external face to the atmospheric pressure and of springs connected directly to the valve body in such manner that the resultant of the piston and spring actions may be directly opposed and equal to the engine suction, whatever the angle of the valve might be.

2. In combination, an intake pipe for internal combustion engines arranged for variable fluid flow, a valve mounted therein and subject to the action of said fluid, a chamber adjacent said intake, springs arranged in said chamber, one end of each spring being carried by adjustable supports, the opposite end of said spring being connected at spaced points to said valve body, and an intermediate member provided between one of said springs and said valve and positioned to be subject to both the fluid of said intake and the atmospheric pressure.

LEON SAIVES.